US006560084B1

(12) United States Patent
Bilac et al.

(10) Patent No.: US 6,560,084 B1
(45) Date of Patent: May 6, 2003

(54) CIRCUIT BREAKER HAVING PROGRAMMABLE AMPLIFIER

(75) Inventors: Mario Bilac, Lawrenceville, GA (US); Peter Spenlove Staley, Kings Park, NY (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/435,110

(22) Filed: Nov. 5, 1999

(51) Int. Cl.[7] .................................. H02H 3/08
(52) U.S. Cl. .................... 361/93.1; 361/93.2; 361/93.3
(58) Field of Search ................ 361/93.2, 93.3, 361/94, 96, 100, 101, 105, 93, 78, 79, 93.1

(56) References Cited

U.S. PATENT DOCUMENTS

| | | | |
|---|---|---|---|
| 4,208,689 A | * 6/1980 | Dunham et al. ............... 361/48 |
| 4,295,175 A | * 10/1981 | Cordray ........................ 361/69 |
| 4,477,701 A | 10/1984 | Castonguay et al. .......... 200/50 |
| 4,603,313 A | 7/1986 | Shimp et al. ................ 335/172 |
| 4,628,397 A | 12/1986 | Gareis et al. ................. 361/98 |
| 4,631,625 A | * 12/1986 | Alexander et al. ............ 361/94 |
| 4,649,455 A | 3/1987 | Scott ........................... 361/93 |
| 4,675,641 A | 6/1987 | Hampton et al. ............. 337/82 |
| 4,694,374 A | * 9/1987 | Verbanets ..................... 361/96 |
| 4,728,914 A | 3/1988 | Morris et al. .................. 335/6 |
| 4,958,252 A | * 9/1990 | Murphy ........................ 361/93 |
| 5,027,091 A | 6/1991 | Lesslie et al. ............... 335/132 |
| 5,136,457 A | * 8/1992 | Durivage ...................... 361/93 |
| 5,331,500 A | 7/1994 | Corcoles et al. .............. 361/93 |
| 5,381,120 A | 1/1995 | Arnold et al. ................ 335/35 |
| 5,392,016 A | 2/1995 | Arnold et al. ............... 335/176 |
| 5,751,234 A | 5/1998 | Schlotterer et al. ......... 341/139 |
| 5,796,636 A | * 8/1998 | Andrews ............... 364/571.01 |
| 5,940,257 A | * 8/1999 | Zavis .......................... 361/42 |
| 6,049,143 A | * 4/2000 | Simpson et al. ............ 307/126 |

* cited by examiner

Primary Examiner—Brian Sircus
Assistant Examiner—Z Kitov

(57) ABSTRACT

A circuit breaker (10) (FIG. 1) has a power line (12) for carrying a power signal from a source to a load and a current transformer (14, 16, 18, 20) configured to sense the power signal and provide a sense signal based on the power signal at a first terminal (14a, 16a, 18a, 20a) (FIG. 2). The circuit breaker (10) includes a control circuit (26) configured to receive a first data message and to provide a second data message based on the first data message at a second terminal (40). The circuit breaker (10) further includes a programmable amplifier (30) coupled to the first terminal (14a, 16a, 18a, 20a) and the second terminal (40) configured to receive the sense signal, to receive the second data message, to amplify the sense signal based on the second data message, and to provide the amplified sense signal at a third terminal (42). A method of constructing the circuit breaker (10) is provided (FIG. 3), including providing a circuit breaker (56) component having a computer-readable indicia (58) representative of a desired rating of the circuit breaker (10); coupling an electronic module (22) to the circuit breaker component (56), the electronic module having the control circuit (26) and the programmable amplifier (30); scanning the computer-readable indicia (58); and providing the first data message to the control circuit (26), wherein the first data message is based on the scanned computer-readable indicia (58).

20 Claims, 3 Drawing Sheets

CIRCUIT BREAKER HAVING PROGRAMMABLE AMPLIFIER

FIELD OF THE INVENTION

The present invention relates generally to the field of circuit breakers and more specifically to a circuit breaker having a programmable amplifier.

BACKGROUND OF THE INVENTION

A circuit breaker is typically characterized by a current rating which conventionally corresponds to the current at or above which the circuit breaker will trip (open), disconnecting a source of power from a load. The circuit breaker includes a current transformer (CT) having a winding in close proximity to a power line carrying alternating current. The current transformer provides a sense signal (e.g., a secondary current signal induced by the alternating current of the power line) representative of the power signal in the power line to the control circuitry of the circuit breaker. The control circuitry monitors the secondary current signal and trips the unit based on the monitored signal.

Circuit breakers come in a wide range of current ratings (e.g., 63 Amp, 200 Amp, 250 amp, 1600 Amp, etc.). Typically, each circuit breaker has a different CT having a rating corresponding to the desired rating of the circuit breaker. The winding of the CT is manufactured to be particularly suitable with the desired rating of the circuit breaker and correspondingly suitable to the current load carried in the power line. With the advent of electronic trip units (ETUs), for monitoring the secondary current signal and for tripping the circuit breaker, it has become necessary to manufacture an ETU for each line of circuit breakers based on the nominal circuit breaker rating.

According to one system, the ETU is provided with a hard-coded program that tells the ETU it is, for example, a 200 Amp circuit breaker. The drawback of this system is that ETUs must be inventoried for each current rating which adds significant cost and complexity to the manufacturing process of the circuit breakers. Another system utilizes programmable ETUs with software tables for all ratings of circuit breakers. A plastic connector (e.g., a jumper) is provided on the circuit board which couples one of a plurality of pins to ground to indicate to the ETU its rating and, correspondingly, which software table to use to interpret (e.g., scale) the secondary current signal. This system requires additional memory space, circuit board space, and added installation steps (e.g., to properly connect the jumper) which adds cost and complexity to the design.

There is a need for an improved circuit breaker design that does not require the inventory or cost associated with manufacturing and installing customized ETUs for a large number of circuit breakers and which does not result in large amounts of unused memory, circuit board space or added installation costs. There is also a need for an improved circuit breaker design that would provide for a CT having one rating to be used in circuit breakers having a range of ratings to reduce the costs associated with manufacturing and inventorying a wide array of CTs. Further, there is a need for an improved circuit breaker design that would allow the same microprocessor and software program to be used for current transformers rated from 63 Amps to 1600 Amps, and beyond. Further still, there is a need for an improved circuit breaker design that would facilitate ease of maintenance, repair, and installation of the circuit breaker.

SUMMARY OF THE INVENTION

One embodiment of the invention relates to a circuit breaker having a power line for carrying a power signal from a source to a load and a current transformer configured to sense the power signal and provide a sense signal based on the power signal at a first terminal. The circuit breaker includes a control circuit configured to receive a first data message and to provide a second data message based on the first data message at a second terminal. The control circuit further includes a programmable amplifier coupled to the first terminal and the second terminal configured to receive the sense signal, to receive the second data message, to amplify the sense signal representative of the second data message, and to provide the amplified sense signal at a third terminal.

Another embodiment of the invention relates to a method for constructing a circuit breaker, including: providing a circuit breaker component having a computer-readable indicia representative of a desired rating of the circuit breaker; coupling an electronic module to the circuit breaker component, the electronic module including: a control circuit configured to receive a first data message and to provide a second data message based on the first data message at a first terminal; and a programmable amplifier coupleable to a current transformer and the output terminal configured to receive a sense signal from the current transformer, to receive the second data message, to amplify the sense signal based on the second data message, and to provide the amplified sense signal at a second terminal. The method further includes scanning the computer-readable indicia and providing the first data message to the control circuit, wherein the first data message is based on the scanned computer-readable indicia.

Yet another embodiment of the invention relates to a method for repairing a circuit breaker, including removing a first electronic trip unit from the circuit breaker; coupling a second electronic trip unit to the circuit breaker, the second electronic trip unit including: a control circuit configured to receive a first data message and to provide a second data message based on the first data message at a first terminal and a programmable amplifier coupleable to a current transformer and the output terminal configured to receive a sense signal from the current transformer, to receive the second data message, to amplify the sense signal based on the second data message, and to provide the amplified sense signal at a second terminal. The method further includes providing the first data message to the control circuit, whereby the second electronic trip unit is programmed with the first data message.

Still another embodiment of the present invention relates to a circuit breaker, having: means for sensing a power signal and for generating a sense signal representative of the power signal; means for amplifying the sense signal based on a data message; means for providing the data message to the means for amplifying; and means for tripping the circuit breaker based on the amplified sense signal.

DETAILED DESCRIPTION OF THE PREFERRED EMBODIMENTS

Figure 1:
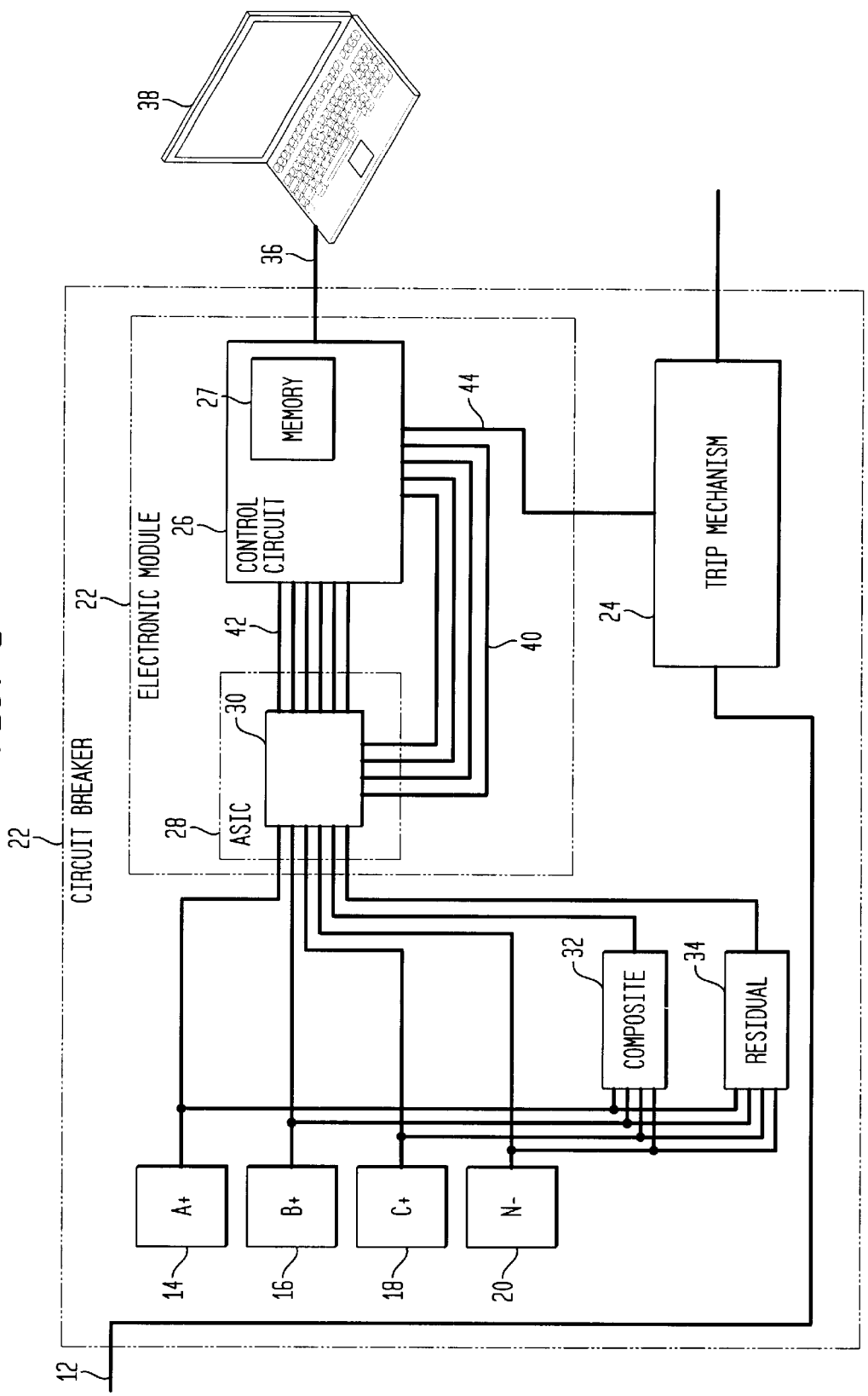
FIG. 1 is a block diagram of a circuit breaker according to an exemplary embodiment.

Referring to FIG. 1, a circuit breaker 10 is disclosed having a power line 12 for providing a power signal from a source (not shown) to a load (not shown). In this exemplary embodiment, the power signal is a three-phase power signal having four components designated as A+, B+, C+, and N−. Alternatively, a three phase power signal may be provided to a circuit breaker using only three components, namely A+, B+, and C+. Circuit breaker 10 further includes a plurality of sensing circuits (e.g., current transformers (CTs)) 14, 16, 18, and 20 coupled to an electronic module 22 (e.g., an electronic trip unit) that is coupled to a trip mechanism 24. Electronic module 22 includes a control circuit 26 (e.g., a microprocessor or communications circuit) coupled to an application specific integrated circuit 28 (ASIC) having a programmable amplifier 30 (e.g., a gain stage amplifier) embedded therein. Alternatively, control circuit 26 and ASIC 28 could be integrated as a system on a chip or into a microprocessor, or control circuit 26 could be a portion of ASIC 28.

Circuit breaker 10 further includes a composite circuit 32 and a residual circuit 34 coupled to programmable amplifier 30 and a communications port 36 (e.g., a connection terminal or electrical interface) coupleable to a personal computer 38 (e.g., a laptop computer, personal digital assistant, etc.).

During manufacturing, maintenance, installation, or repair, personal computer 38 is coupled to communications port 36. Personal computer 38 provides a data message to control circuit 26 via port 36. The data message is an RS-232 format digital serial message and includes data representing the current rating of sensing circuits 14–20 and the desired current rating of circuit breaker 10, which may or may not be the same. In this exemplary embodiment, the current ratings of sensing circuits 14–20 are all the same and range from 63 Amperes to 1600 Amperes, but may alternatively be different from one another and include ratings greater or less than those listed.

During operation, control circuit 26 generates a program message based on the data message. The program message is a four-bit digital message representing one of sixteen possible settings for programmable amplifier 30. Alternatively, the data message may be configured as any number of bits providing any number of possible settings. The program message is provided to programmable amplifier 30 of ASIC 28 along a bus 40. Sensing circuits 14, 16, 18, and 20 sense the A+ phase, B+ phase, C+ phase, and N− phase, respectively, of the power signal on power line 12 and provide four phase sense signals representative thereof to ASIC 28. Composite circuit 32 receives the four phase sense signals and provides a composite sense signal representing a composite of the phase sense signals to ASIC 28. Residual circuit 34 provides a residual sense signal representing a residual of the phase sense signals to ASIC 28. Composite circuit 32 and residual circuit 34 operate as disclosed in commonly assigned U.S. application Ser. No. 09/435,186 entitled "Method and Apparatus for Differentially Sensing Ground Fault and Individual Phases" by Bilac et al., which is herein incorporated by reference.

Programmable amplifier 30 amplifies the received sense signals according to a selected gain expressed by the program message and provides the amplified sense signals on a bus 42. Control circuit 26 receives the amplified sense signals from bus 42 and monitors these sense signals. Control circuit 26 may further apply an error correction factor to the sense signals in the form of a software amplification algorithm, as will be described below with reference to the Example.

If the sense signals indicate that a circuit breaker trip is required (e.g., due to overcurrent, ground fault, etc.), control circuit 26 provides a trip signal on a bus 44 to trip mechanism 24 which trips the circuit breaker, separating the source from the load along power line 12.

According to one exemplary overcurrent test, control circuit 26 receives the amplified sense signals and digitizes them (e.g., by utilizing an analog-to-digital (A/D) converter). Control circuit 26 then monitors the digitized sense signals. If one or more of the digitized sense signals exceeds the current rating of circuit breaker 10, control circuit 26 begins adding to an accumulator (e.g., a memory location) and eventually commands trip mechanism 24 to trip after a predetermined period of time. If the sense signals greatly exceed the current rating, control circuit 26 adds to the accumulator quicker than if the sense signals only marginally exceed the current rating.

Figure 2:
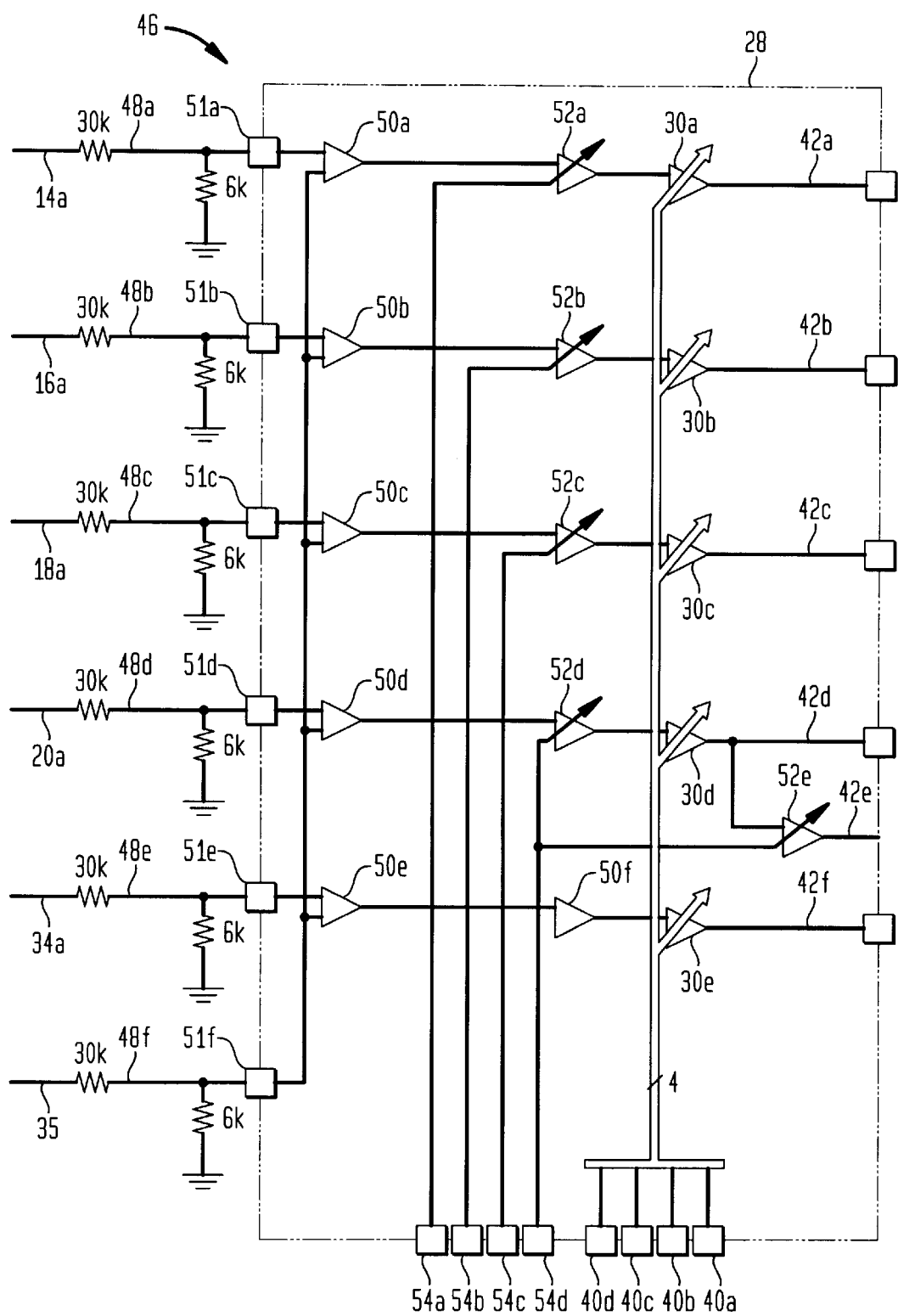
FIG. 2 is a schematic diagram of a portion of an application specific integrated circuit in the circuit breaker of FIG. 1.

Referring now to FIG. 2, a more detailed view of a portion 46 of electronic module 22 is shown. Portion 46 includes a plurality of input terminals 51a–f to ASIC 28, a plurality of attenuator circuits 48a–f, a plurality of fixed gain amplifiers 50a–f, a plurality of adjustable gain amplifiers 52a–e, and a plurality of programmable amplifiers 30a–e. As inputs, portion 46 includes input terminals 14a, 16a, 18a, 20a, 34a, and 35, programmable control inputs 40a–d, and adjustable control inputs 54a–d. As outputs, portion 46 includes terminals 42a–f.

Sense signals from sensing circuits 14, 16, 18, and 20 and from residual circuit 34 are applied to input terminals 14a, 16a, 18a, 20a and 34a, respectively, with terminal 35 acting as a common ground for the sense signals. In this embodiment, the sense signals are differential signals and are generated as described in the above-referenced commonly assigned U.S. App. Ser. No. 09/435,186 entitled "Method and Apparatus for Differentially Sensing Ground Fault and Individual Phases" by Bilac et al., previously incorporated by reference.

With reference to the A+ phase sense signal, the operation of portion 46 in FIG. 2 will now be described. The A+ phase sense signal is provided on terminal 14a, through attenuator 48a having a gain of one-sixth (⅙) to an input terminal 51a of ASIC 28. Attenuator 48a comprises a series resistor (e.g., a 30 kOhm resistor) coupled between terminal 14a and input terminal 51a and a parallel resistor coupled between input terminal 51a and a ground. The attenuated signal is then provided to the inverting input of amplifier 50a and amplified with a gain of one by amplifier 50a. The non-inverting input of amplifier 50a receives a differential reference for the A+ phase sense signal provided by terminal 35 through a like attenuator 48 f through input terminal 51f of ASIC 28. Terminals 14a and 35 are coupled to opposite ends of an A+ phase resistor in series with sensing circuit 14.

The output of amplifier 50a is provided to an adjustable amplifier 52a having a LOW or HIGH gain (e.g., one or 6.875 in this embodiment) which is adjusted according to a one or zero provided at control input 54a. The one or zero may be hardcoded or provided by control circuit 26 in response to various conditions or user adjustments. The purpose of amplifier 52a is to improve the accuracy of the sense signal. For example, when the sense signal indicates the current through sensing circuit 14 is 0.1× to 1.2× (10% to 120% of the sensing circuit rating) HIGH gain is applied to the sense signal. When the sense signal indicates the current through sensing circuit 14 is greater than 1.2×, LOW gain is applied to the sense signal.

The adjusted signal is then provided to programmable amplifier 30a which amplifies the adjusted signal according to the four digit program message provided on programmable control inputs 40a–d. Thus, control inputs 40a–d are coupled to program inputs associated with programmable amplifier 30a. The four digit message commands amplifier 30a to provide one of sixteen possible gains ranging between and including 2.315 and 3.617, as will be described in greater detail hereinafter. The programmably amplified signal is then provided to output terminal 42a and subsequently along bus 42 to control circuit 26 (FIG. 1) for monitoring.

Similarly, B+ phase, C+ phase and N− phase sense signals are provided on terminals 16a, 18a, and 20a, through respective attenuators 48b–d, to respective inputs 51b–d to ASIC 28, through fixed gain amplifiers 50b–d, each having reference to terminal 35, to adjustable gain amplifiers 52b–d having gains dependent on control terminals 54b–d, to adjustable amplifiers 30b–d, respectively. Programmable amplifiers 30b–d likewise read the same four digit program message from control terminals 40a–d and amplify the adjusted sense signals from B+ phase, C+ phase, and N− phase with the same amplification as the A+ phase sense signal. The programmably amplified signals are then provided to terminals 42b–d and subsequently along bus 42 to control circuit 26 (FIG. 1).

The programmably amplified gain signal from the N− phase sense signal is further provided to adjustable amplifier 52e. Adjustable amplifier 52e is coupled to control input 54 d. The output of amplifier 52e is provided to terminal 42e and subsequently along bus 42 to control circuit 26. The signal provided on terminal 42e is used by control circuit 26 to detect a ground fault.

FIG. 2 also discloses a residual signal input terminal 34a which is coupled to residual circuit 34. The residual signal is coupled through a one-sixth (⅙) attenuator 48e to an input 51e of ASIC 28 to fixed gain amplifier 50e having a gain of two, to fixed gain amplifier 50f having a gain of five, through adjustable gain amplifier 30e having the same amplification as amplifiers 30a–d based on the program message provided at terminals 40a–d. The programmably amplified signal is provided at terminal 42f which is coupled to control circuit 26 (FIG. 1). The programmably amplified signal is then provided to control circuit 26 via bus 42 and indicates to control circuit 26 when a residual ground fault occurs. A similar circuit may be added to provide the output of composite circuit 32 through ASIC 28 to control circuit 28.

As mentioned, programmable amplifiers 30a–e amplify the sense signals with one of sixteen predetermined gains ranging from 2.315 to 3.617. The method by which control circuit 26 generates the program message will now be discussed in further detail. First, the equations will be set forth; second, an implementation of the equations in integer math will be set forth, since the use of integer math may save computational time and memory space.

Control circuit 26 receives the data message on terminal 26 which includes the rating of the sensing circuits installed therein ($I_s$) and the nominal breaker rating ($I_r$) and uses these values to first select the ication, as follows:

$$I_{d1}=I_r/I_s$$

wherin $I_{d1}$ is the derated current rating.

Next, control circuit 26 refers to a table of Percent Deratings and associated Program Messages stored in a memory (e.g., a Read Only Memory) coupled to or integral with control circuit 26.

| J | Program Message | Derating Gain Value | Real Percent Derating ($d_p$) | Integer Value ($d_i$) |
|---|---|---|---|---|
| 0 | 1111 | 3.617 | 64 | 655 |
| 1 | 1110 | 3.511 | 65.933 | 675 |
| 2 | 1101 | 3.408 | 67.924 | 695 |
| 3 | 1100 | 3.308 | 69.975 | 716 |
| 4 | 1011 | 3.211 | 72.088 | 738 |
| 5 | 1010 | 3.117 | 74.265 | 760 |
| 6 | 1001 | 3.025 | 76.508 | 783 |
| 7 | 1000 | 2.937 | 78.819 | 807 |
| 8 | 0111 | 2.851 | 81.199 | 831 |
| 9 | 0110 | 2.767 | 83.651 | 856 |
| 10 | 0101 | 2.686 | 86.177 | 882 |
| 11 | 0100 | 2.607 | 88.78 | 909 |
| 12 | 0011 | 2.531 | 91.461 | 936 |
| 13 | 0010 | 2.457 | 94.223 | 964 |
| 14 | 0001 | 2.385 | 97.069 | 993 |
| 15 | 0000 | 2.315 | 100 | 1024 |

The Percent Deratings ($d_p$) correspond to selected Derating Gain Values of the sense signals which are pre-programmed for typical nominal circuit breaker ratings. Specifically, the derating gain values are selected to accommodate a large number of sensing circuits having different ratings within the 63–1600 Amp range. The derating gain values are selected based on the minimum amount of current from the sense signal needed to power electronic module 22, the minimum continuous current setting or "long time pickup," and all the desired circuit breaker ratings. For example, selecting approximately 64 percent as the lowest percent derating, the number of sensing circuits needed is reduced to less than one-third of the number of sensing circuits accommodated.

Control circuit 26 selects the Percent Derating ($d_p[J]$) from the table closest to the derated current rating ($I_{d1}$). In this embodiment, the derated current rating ($I_{d1}$) is compared to each of the Percent Deratings ($d_p$) until $I_{d1}$ is greater than or equal to the Percent Derating ($d_p$). Then, the Percent Derating just after the greater than or equal to Percent Derating is selected as $d_p[J]$. This method is employed for ease of computation. Alternatively, the Percent Derating just before the greater than or equal to Percent Derating could be selected as $d_p[J]$, or another method may be employed to obtain the Percent Derating closest to the derating current rating ($I_{d1}$).

Next, the Program Message corresponding to $d_p[J]$ (i.e., Program_Message[J]) is recalled from memory and provided to programmable amplifiers 30a–e. The corresponding Derating Gain Value represents the actual gain of programmable amplifiers 30a–e applied to the sense signals.

Next, an error correction value is calculated as follows:

$$I_{d2}=I_s \cdot d_p[J]$$

$$e=I_r-I_{d2}$$

where $I_{d2}$ is the actual current derating and e is the error correction value. The error correction value (e) equals the difference between the nominal circuit breaker rating and the actual current derating ($I_{d2}$). The error correction value (e) is then used to condition or scale (e.g., via software) the programmably amplified signals sampled by control circuit 26 to provide a more accurate representation of the sensed current. The error correction value is stored in a non-volatile memory for use upon subsequent power-ups of the circuit breaker.

According to one alternative embodiment, the error correction value (e) is calculated by:

$$e = \frac{Id_1}{d_p[J]}$$

In this embodiment, the programmably amplified signals are corrected as follows:

corrected_sense-signal=sense_signal·e

An (e) of 1 implies zero correction applied.

If the error correction value (e) is very small (e.g., does not exceed a predetermined value or predetermined percentage of the sensing circuit rating ($I_s$)), other errors associated with sampling of the sense signal and signal conditioning of the sense signal will dominate and, therefore, the error correction value may be discarded.

Now, the same equations will be set forth using integer math. The Integer Values ($d_i$) in the table are integer representations of the Percent Deratings ($d_p$). The Integer Values ($d_i$), stored in a memory accessible by control circuit 26, are used by control circuit 26 to represent the Percent Deratings ($d_p$) to avoid the need for floating point math. Thus, the Integer Values ($d_i$) are generated as follows:

$$d_i[J] = \text{floor}\left(\frac{d_p[J]}{100} \cdot 1024\right).$$

where $d_i[J]$ is the Integer Value for J=0 to 15 and $d_p[J]$ is the associated Percent Derating. The "floor" operator truncates any decimal. The value 1024 scales values to digital integers from 0 to 1024 in which 1024 represents unity.

The derated current rating is calculated as follows:

$$I_{d1} = \text{floor}\left(\frac{I_r \cdot 1024}{I_s}\right).$$

Control circuit 26 selects the Integer Value closest to the derated current rating ($I_{d1}$). In this embodiment, $I_{d1}$ is compared to each of the integer values until $I_{d1}$ is greater than or equal to the integer value. Then, the integer value just after the greater than or equal to integer value is selected as $d_i[J]$. Again, this method is employed for ease of computation. Alternatively, the Integer Value just before the greater than or equal to Integer Value could be selected, or another method may be employed to obtain the Integer Value closest to the derating current rating ($I_{d1}$). The Program Message corresponding to $d_i[J]$ (i.e., Program_Message[J]) is then provided to programmable amplifiers 30a–e. The corresponding Derating Gain Value represents the actual gain of programmable amplifiers 30a–e applied to the sense signals.

Next, an error correction value is calculated as follows:

$$c = \text{floor}\left[I_{d1} \frac{(1024)}{d_i[J]}\right]$$

$$I_{d2} = \frac{\left[\left(I_s \cdot \frac{d_i[J]}{100}\right)C\right]}{1024}$$

$$e = I_r - I_{d2}$$

where $I_{d2}$ is the actual current derating and e is the error correction value. The error correction value (e) equals the difference between the nominal circuit breaker rating and the actual current derating ($I_{d2}$) The error correction value (e) is then used to condition or scale (e.g., via software) the programmably amplified signals sampled by control circuit 26 to provide a more accurate representation of the sensed current, for example, as described hereinabove.

EXAMPLE

Using the integer math routine described above, where the data message indicates that the sensing circuits ($I_s$) are rated at 600 Amps and the breaker ($I_r$) is rated at 550 Amps, $I_{d1}$ is calculated as follows:

$$I_{d1} = \text{floor}\left[\frac{(I_r \cdot 1024)}{I_s}\right]$$

$$I_{d1} = 938.000$$

Next an Integer Value closest to the derated current rating ($I_{d1}$) is selected by comparing $I_{d1}$ to each Integer Value until it is found that 938 exceeds 936 (i.e., J=12). In this example, the next midrange integer value 964 is selected as $d_i[13]$. With J=13, Program_Message[13], "0010", is provided to programmable amplifiers 30a–e.

Next, the error correction value (e) is calculated as follows:

$$c = \text{floor}\left[I_{d1} \frac{(1024)}{d_i[13]}\right]$$

$$c = 996.000$$

$$I_{d2} = \frac{\left[\left(I_s \cdot \frac{d_p[13]}{100}\right)C\right]}{1024}$$

$$I_{d2} = 549.880$$

$$e = I_r - I_{d2}$$

$$e = 0.120$$

In this example, the error e=0.120 is marginal relative to errors introduced in the sampling and signal conditioning process. Therefore, the error correction value (e) is not applied to the sense signals.

One particularly advantageous aspect of the present invention is that a new circuit breaker rating (e.g., 700 Amps) can be added to an existing product line without requiring new CTs, new electronic trip units, or new software. The control circuit is simply provided with the new circuit breaker rating and the rating of the current transformers being used (e.g., rated greater than or equal to 700 Amps), and the control circuit and ASIC condition the sense signals for the new rating.

Figure 3:
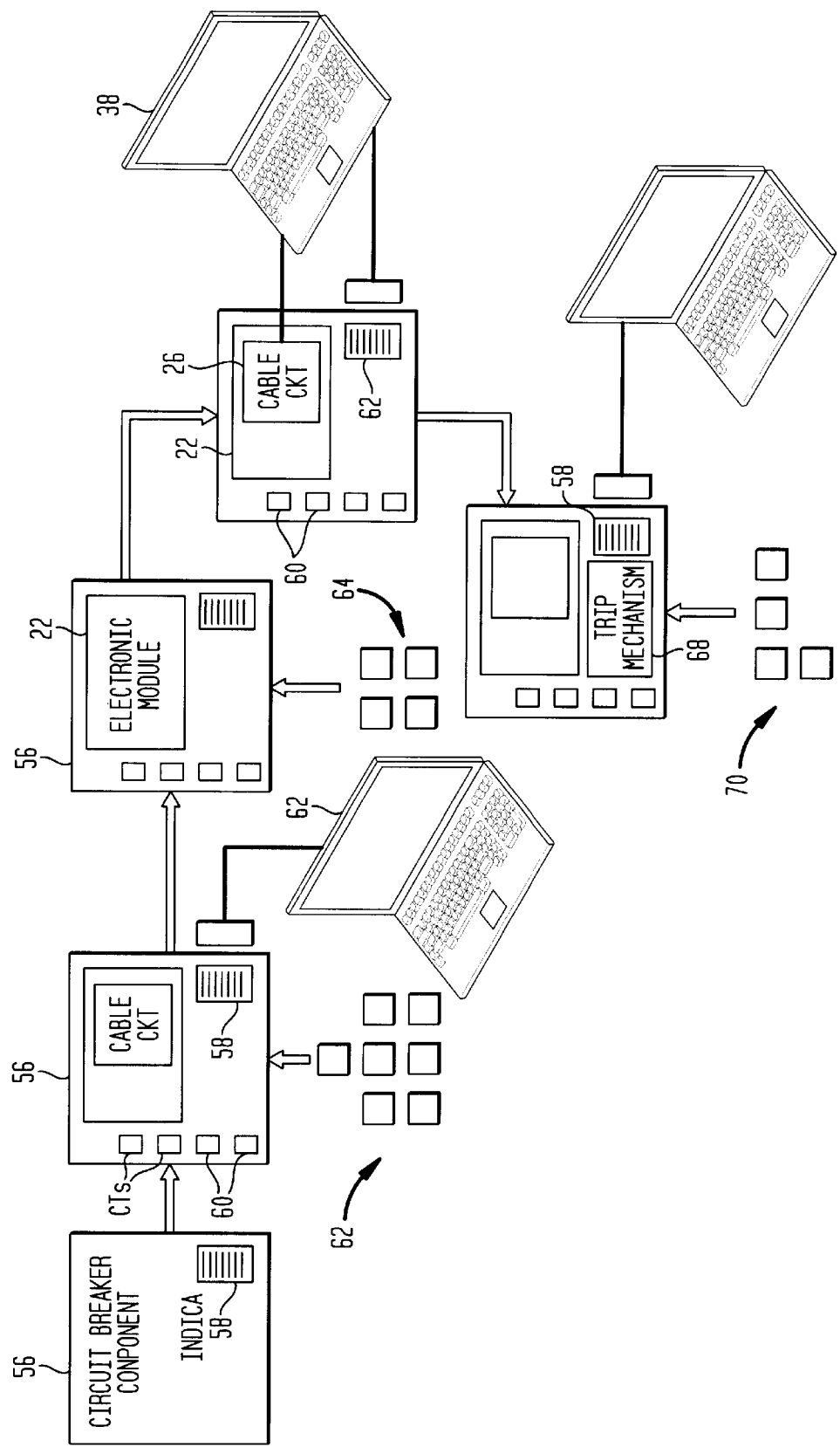
FIG. 3 is a flow diagram illustrating a method of manufacturing the circuit breaker of FIG. 1.

Referring now to FIG. 3, a method of constructing or manufacturing a circuit breaker is disclosed. A circuit breaker component 56 is provided as a frame in this embodiment, but may alternatively be a casing, a sensing circuit, a trip mechanism, or other circuit breaker component. A computer-readable indicia 58 (e.g., a label having a bar code) is coupled to or applied to component 56 to indicate the desired rating (e.g., 200 Amps) of circuit breaker component 56 which may be, for example, a rating corresponding to the rating of a sensing circuit associated with the circuit breaker. Indicia 58 also indicates the rating of the sensing circuits to be installed in the circuit breaker.

Next, one or more of sensing circuits 60 are coupled to circuit breaker component 56. In this step, a computer 62 scans computer-readable indicia 58 to determine the rating of the sensing circuits to be installed. Based on the scanning step, sensing circuits of the desired rating (e.g., 200 Amps)

are selected from a bin 62 and coupled to component 56. Alternatively, indicia 58 may include only a desired circuit breaker rating and not a desired sensing circuit rating in which case a sensing circuit rated at or above the rating of the circuit breakers are selected from bin 62 and coupled to component 56.

Next, an electronic module 22 (e.g., an electronic trip unit) such as that disclosed hereinabove with respect to FIGS. 1 and 2 is coupled to component 56. Electronic module 22 is selected from a bin 64 containing a plurality of substantially similar electronic modules 22.

Next, control circuit 26 of electronic module 22 is programmed to tell electronic module 22 the desired rating of the circuit breaker and the rating of sensing circuits 60. Alternatively, the rating of sensing circuits 60 can be scanned from an indicia affixed to one of sensing circuits 60. The final step illustrated in FIG. 3 couples a trip mechanism 68 selected from a trip mechanism bin 70 to component 56. A third computer 72 scans indicia 58 and selects the proper trip mechanism, if necessary, from bin 70 for installation in component 56.

A further feature of circuit breaker 10 relates to an improved method of repairing circuit breaker 10. A maintenance person first diagnoses the malfunction of the circuit breaker, for example, by using the circuit breaker tester disclosed in commonly assigned U.S. application Ser. No. 09/435,187 titled "Portable Tester for Electronic Circuit Breaker" to Dollar et al. If the electronic module needs to be replaced, the maintenance person first removes the electronic trip unit which is malfunctioning or broken. The maintenance person then couples a second, new, electronic trip unit, such as electronic module 22, to the circuit breaker. Next, the maintenance person inputs the rating of the sensing circuits and the desired rating of the circuit breaker to a computer (e.g., a laptop, personal digital assistant, etc.), couples the computer to control circuit 26 of electronic module 22, and provides a data message to control circuit 26 to program the second electronic trip unit with the rating of the sensing circuits and the desired rating of the circuit breaker. Since electronic module 22 includes programmable amplifier 30 and control circuit 26, the maintenance person need only carry one general purpose electronic module rather than having to carry different electronic modules having different current ratings. Furthermore, since the present invention allows the use of one sensing circuit for multiple circuit breaker ratings, the maintenance person need carry fewer replacement sensing circuits than in the prior art.

While the embodiments illustrated in the FIGS. and described above are presently preferred, it should be understood that these embodiments are offered by way of example only. For example, while the programmable amplifier herein is part of an application specific integrated circuit, other configurations of programmable amplifiers are contemplated and other ways of programming the amplification of the sense signals are contemplated. The invention is not limited to a particular embodiment, but extends to various modifications that nevertheless fall within the scope of the appended claims.

What is claimed is:

1. A circuit breaker having a power line for carrying a power signal from a source to a load and a current transformer configured to sense the power signal and provide a sense signal representative of the power signal at a first terminal, comprising:
a computer-readable indicia representative of a preselected rating of the circuit breaker;
a control circuit configured to receive a first data message based on the computer-readable indicia and to provide a second data message based on the first data message at a second terminal; and
a programmable amplifier coupled to the first terminal and the second terminal configured to receive the sense signal, to receive the second data message, to amplify the sense signal based on the second data message, and to provide the amplified sense signal at a third terminal.

2. The circuit breaker of claim 1, wherein the control circuit is coupled to the third terminal and configured to receive the amplified sense signal.

3. The circuit breaker of claim 2, wherein the control circuit is configured to monitor the amplified sense signal and to trip the circuit breaker based on the monitored amplified sense signal.

4. The circuit breaker of claim 1, wherein the sense signal is a residual signal.

5. The circuit breaker of claim 1, the sensing circuit including a first current transformer configured to sense an A+ phase of the power signal, a second current transformer configured to sense a B+ phase of the power signal, and a third current transformer configured to sense a C+ phase of the power signal, further comprising: wherein the sense signal includes an A+ phase sense signal, a B+ phase sense signal, and a C+ phase sense signal.

6. The circuit breaker of claim 1, wherein the control circuit is configured to receive the first data mes from a personal computer.

7. The circuit breaker of claim 1, wherein the second data message is a digital message.

8. The circuit breaker of claim 1, wherein the programmable amplifier is configured to scale the sense signal such that the amplified sense signal has a predetermined maximum value when the programmable amplifier receives the maximum value of the sense signal regardless of the rating of the current transformer.

9. A method for constructing a circuit breaker, comprising:
providing a circuit breaker component having a computer-readable indicia representative of a desired rating of the circuit breaker;
coupling an electronic module to the circuit breaker component, the electronic module including:
a control circuit configured to receive a first data message and to provide a second data message based on the first data message at a first terminal; and
a programmable amplifier coupleable to a current transformer and the output terminal configured to receive a sense signal from the current transformer, to receive the second data message, to amplify the sense signal based on the second data message, and to provide the amplified sense signal at a second terminal;
scanning the computer-readable indicia; and
providing the first data message to the control circuit, wherein the first data message is based on the scanned computer-readable indicia.

10. The method of claim 9, further comprising coupling the current transformer to the circuit breaker component.

11. The method of claim 9, wherein the computer-readable indicia includes a bar code.

12. The method of claim 10, wherein the desired rating corresponds to the rating of the current transformer.

13. The method of claim 9, wherein the rating of the current transformer is between approximately 63 Amperes and 1600 Amperes.

14. The method of claim 9, wherein the control circuit is coupled to the second terminal and configured to monitor the amplified sense signal and to trip the circuit breaker based on the monitored amplified sense signal.

15. A method for repairing a circuit breaker with the breaker having associated computer-readable indicia, the method, comprising:

removing a first electronic trip unit from the circuit breaker;

scanning the computer-readable indicia;

coupling a second electronic trip unit to the circuit breaker, the second electronic trip unit including;
  a control circuit configured to receive a first data message and to provide a second data message based on the first data message at a first terminal; and
  a programmable amplifier coupleable to a current transformer and the output terminal configured to receive a sense signal from the current transformer, to receive the second data message, to amplify the sense signal based on the second data message, and to provide the amplified sense signal at a second terminal; and providing the first data message to the control circuit, whereby the second electronic trip unit is programmed with the first data message based on the scanned computer-readable indicia.

16. The method of claim 15, wherein the second data message represents the rating of the circuit breaker.

17. The method of claim 15, wherein the second data message represents the rating of a current transformer coupled to the circuit breaker.

18. The method of claim 15, wherein the rating of the current transformer is between approximately 63 Amperes and 1600 Amperes.

19. The method of claim 15,,wherein the control circuit is coupled to the second terminal and configured to monitor the amplified sense signal and to trip the circuit breaker based on the monitored amplified sense signal.

20. A circuit breaker, comprising:

means for sensing a power signal and for generating a sense signal representative of the power signal;

means for indicating, in computer-readable indicia, with the means for indicating representative of rating of the circuit breaker, wherein the means for indicating conditions the sense signal;

means for amplifying the sense signal based on a data message;

means for providing the data message to the means for amplifying; and means for tripping the circuit breaker based on the amplified sense signal.

* * * * *